US011996656B2

(12) United States Patent
Wang et al.

(10) Patent No.: US 11,996,656 B2
(45) Date of Patent: May 28, 2024

(54) SIGNAL CONNECTOR AND TERMINAL DEVICE

(71) Applicant: Huawei Technologies Co., Ltd., Shenzhen (CN)

(72) Inventors: Zewen Wang, Dongguan (CN); Jun Chen, Dongguan (CN); Tao Ye, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 360 days.

(21) Appl. No.: 17/536,720

(22) Filed: Nov. 29, 2021

(65) Prior Publication Data

US 2022/0085555 A1 Mar. 17, 2022

Related U.S. Application Data

(63) Continuation of application No. PCT/CN2020/092744, filed on May 28, 2020.

(30) Foreign Application Priority Data

May 28, 2019 (CN) ........................ 201910453335.1

(51) Int. Cl.

*H01R 13/6587* (2011.01)
*H01R 13/502* (2006.01)
*H01R 13/518* (2006.01)

(52) U.S. Cl.

CPC ....... *H01R 13/6587* (2013.01); *H01R 13/502* (2013.01); *H01R 13/518* (2013.01)

(58) Field of Classification Search

CPC ............ H01R 13/6587; H01R 13/6586; H01R 13/6585; H01R 13/6581; H01R 13/658; H01R 13/502; H01R 13/506; H01R 13/508; H01R 13/514; H01R 13/516; H01R 13/518

USPC ..................................................... 439/607.07

See application file for complete search history.

(56) References Cited

U.S. PATENT DOCUMENTS

| | | | |
|---|---|---|---|
| 6,435,914 | B1 | 8/2002 | Billman |
| 7,731,537 | B2 | 6/2010 | Amleshi et al. |
| 7,789,708 | B2 | 9/2010 | Laurx et al. |
| 7,798,852 | B2 | 9/2010 | Laurx et al. |
| 7,878,853 | B2 | 2/2011 | Amleshi et al. |
| 8,342,888 | B2 | 1/2013 | Amleshi et al. |

(Continued)

FOREIGN PATENT DOCUMENTS

| | | | |
|---|---|---|---|
| CN | 2513252 | Y | 9/2002 |
| CN | 103151650 | A | 6/2013 |

(Continued)

*Primary Examiner* — Khiem M Nguyen

(74) *Attorney, Agent, or Firm* — Conley Rose, P.C.

(57) ABSTRACT

A signal connector includes a backplane connection part and a subcard connection unit. A first signal terminal pair and a first shielding piece are disposed on the backplane connection part. A second signal terminal pair and a second shielding piece are disposed on the subcard connection unit. When the backplane connection part and the subcard connection unit cooperate with each other, the first signal terminal pair is combined with the second signal terminal pair in a one-to-one manner. The first shielding piece and the second shielding piece form a shielding cavity in which the first signal terminal pair and the second signal terminal pair are wrapped.

20 Claims, 7 Drawing Sheets

(56) References Cited

U.S. PATENT DOCUMENTS

| | | | |
|---|---|---|---|
| 9,728,903 B2 | 8/2017 | Long et al. | |
| 2018/0323525 A1 | 11/2018 | Wanha et al. | |
| 2019/0081441 A1 | 3/2019 | Minnick et al. | |
| 2022/0085555 A1 * | 3/2022 | Wang | H01R 13/502 |

FOREIGN PATENT DOCUMENTS

| | | | |
|---|---|---|---|
| CN | 203503910 | U | 3/2014 |
| CN | 207426306 | U | 5/2018 |
| CN | 109088272 | A | 12/2018 |
| CN | 109494499 | A | 3/2019 |
| CN | 109546384 | A | 3/2019 |
| CN | 109546471 | A | 3/2019 |
| CN | 109599726 | A | 4/2019 |
| EP | 2770588 | A1 | 8/2014 |
| WO | 2015123102 | A1 | 8/2015 |

* cited by examiner

SIGNAL CONNECTOR AND TERMINAL DEVICE

CROSS-REFERENCE TO RELATED APPLICATIONS

This application is a continuation of International Patent Application No. PCT/CN2020/092744, filed on May 28, 2020, which claims priority to Chinese Patent Application No. 201910453335.1, filed on May 28, 2019. The disclosures of the aforementioned applications are hereby incorporated by reference in their entireties.

TECHNICAL FIELD

This application relates to the field of data transmission technologies, and in particular, to a signal connector and a terminal device that are applied to a data transmission system.

BACKGROUND

In a current communications system, an interconnection system, based on a combination of a backplane and a subcard that are of a printed circuit board (PCB), is the most common interconnection architecture. As a bridge between the backplane and the subcard, a signal connector is a key component that affects signal transmission. With continuous improvement of a signal transmission rate, a higher requirement is raised on transmitted signal integrity. A key factor that affects signal integrity is a shielding structure in the signal connector. A currently used shielding structure has only a metal shielding piece, and does not achieve a good shielding effect. Therefore, a connector with a good shielding effect is needed to reduce signal crosstalk between signal terminals.

In addition, a ratio of a quantity of ground pins to a quantity of signal pins needs to be continuously increased, to ensure that a connector signal has a better return path. Usually, the ratio is ensured to be not less than 1. Currently, in application of some connectors, a ground shielding module and a signal module are alternately disposed, to enable a shielding function between transmitted signals. In addition, a return path is also provided for the transmitted signal. Therefore, a design of the ground shielding module is important.

Currently, the ground shielding module is usually designed as a separate shielding piece, to enable the ground shielding module to provide a good return current and reduce or avoid insertion loss resonance. Because the shielding piece is closer to a plane, using the plane as a signal return path helps reduce a loop self-inductance. Therefore, a transient impedance change that a signal faces is smaller, and impedance is easier to control. This helps reduce insertion loss ripples and the insertion loss resonance.

However, due to limitation of a size of a communications device, a separate design of the ground shielding module doubles a size of the connector, and assembly is more complex. In addition, when a differential signal terminal pair is disposed near an edge of the shielding piece, a signal between different terminal pairs can still cause coupling at an edge field outside the edge of the shielding piece.

Therefore, various embodiments of a signal connector with a new shielding structure are described in the present disclosure.

SUMMARY

The present disclosure provides various embodiments of a connector and a terminal device, to resolve a problem of signal crosstalk in a signal transmission process and to improve transmitted signal integrity.

According to a first aspect, a signal connector is provided, including a backplane connection part. The backplane connection part includes a first base, and at least one through hole is disposed on a bottom surface of the first base. The backplane connection part includes at least one signal terminal pair. A first contact end of the first signal terminal pair is inserted into the through hole and fastened, and a second contact end is configured to combine with a second signal terminal pair located in a subcard connection unit. The backplane connection part includes at least one first shielding piece. The first shielding piece is disposed in parallel with the first signal terminal pair. The backplane connection part includes at least one subcard connection unit. The subcard connection unit includes at least one second signal terminal pair, including a first contact end. The second signal terminal pair and the first signal terminal pair are in a one-to-one correspondence. The backplane connection part includes a fastening module. The fastening module is configured to fasten the at least one second signal terminal pair. The at least one second signal terminal pair is arranged in parallel, and the first contact end of the second signal terminal pair extends outwards from a side surface of the fastening module. The subcard connection unit includes a second shielding piece. The second shielding piece is parallel to the second signal terminal pair and is disposed at a periphery of the second signal terminal pair, and the second shielding piece and the first shielding piece are in a one-to-one correspondence. When the subcard connection unit cooperates with the backplane connection part, the second contact end of the first signal terminal pair is combined with the first contact end of the second signal terminal pair in a one-to-one manner, and the first shielding piece cooperates with the second shielding piece in the one-to-one manner, to form a shielding cavity in which the first signal terminal pair and the second signal terminal pair are wrapped.

According to the signal connector provided in embodiments of this application, the first shielding piece and the second shielding piece that cooperate with each other to form the shielding cavity when the backplane connection part cooperates with the subcard connection part are respectively disposed on the backplane connection part and the subcard connection unit, to form the shielding cavity at each signal terminal or a periphery of a signal terminal pair. This avoids crosstalk of signals transmitted on different signal terminals or signal terminal pairs, and improves transmitted signal integrity. In addition, a shielding piece is separately disposed on the backplane connection part and the subcard connection unit. This can reduce processing complexity and facilitate processing.

With reference to the first aspect, in some implementations of the first aspect, the first shielding piece and the second shielding piece are of a C-shaped, U-shaped, or L-shaped piece structure. The first shielding piece cooperates with the second shielding piece in a one-to-one manner, to form a shielding cavity in which the first signal terminal pair and the second signal terminal pair are wrapped. In an embodiment, the first shielding piece cooperates with the second shielding piece, to form an annular shielding cavity that is wrapped around peripheries of the first signal terminal pair and the second signal terminal pair, or the first shielding piece cooperates with the second shielding piece, to form a rectangular shielding cavity that is wrapped around the peripheries of the first signal terminal pair and the second signal terminal pair.

With reference to the first aspect, in some implementations of the first aspect, the subcard connection unit further includes a third shielding piece and a fourth shielding piece. The third shielding piece and the fourth shielding piece respectively cover two sides of the fastening module, to form a first cavity that accommodates the second signal terminal pair.

With reference to the first aspect, in some implementations of the first aspect, at least one first protrusion is disposed on the third shielding piece and/or the fourth shielding piece in a direction facing the first cavity, to enable the third shielding piece and the fourth shielding piece to form at least one contact position.

According to the signal connector provided in the embodiments of this disclosure, protrusion structures facing each other are disposed on two side surfaces of the subcard connection unit, to enable the two side-surface shielding pieces to be connected through the protrusion structures. In this way, a signal return path can be increased, crosstalk between signals can be reduced, and signal integrity can be improved.

With reference to the first aspect, in some implementations of the first aspect, at least one second protrusion is disposed on the third shielding piece and/or the fourth shielding piece in a direction opposite to the first cavity, such that when disposed in parallel, a plurality of subcard connection units can be connected to each other through the at least one second protrusion.

According to the signal connector provided in the embodiments of this application, a protrusion structure in the direction opposite to the first cavity is disposed on at least one side surface of the subcard connection unit, such that when the plurality of subcard connection units is arranged in parallel, adjacent subcard connection units can be in contact with each other through the second protrusion. In this way, the signal return path is increased, the crosstalk between the signals is reduced, and the signal integrity is improved.

With reference to the first aspect, in some implementations of the first aspect, at least one spring is disposed on the second shielding piece, and when the first shielding piece cooperates with the second shielding piece, the spring is in contact with a side surface of the second shielding piece.

According to a second aspect, a signal connector is provided, including a plurality of subcard connection units. The plurality of subcard connection units include a first cavity. Two opposite side surfaces of the first cavity are respectively a third shielding piece and a fourth shielding piece. At least one first protrusion is disposed on the third shielding piece and/or the fourth shielding piece in a direction facing the first cavity, to enable the third shielding piece and the fourth shielding piece to form at least one contact position. The plurality of subcard connection units include at least one second signal terminal pair. The second signal terminal pair is disposed in the first cavity and is parallel to the third shielding piece and/or the fourth shielding piece. A first contact end of the second signal terminal pair extends outwards from a side surface of the first cavity. The plurality of subcard connection units include at least one second shielding piece. The second shielding piece is disposed in parallel with the second signal terminal pair, and the second shielding piece and a first shielding piece are in a one-to-one correspondence.

According to the signal connector provided in embodiments of this disclosure, protrusion structures facing each other are disposed on two side surfaces of the subcard connection unit, to enable the two side-surface shielding pieces to be connected through the protrusion structures. In this way, a signal return path can be increased, crosstalk between signals can be reduced, and signal integrity can be improved.

With reference to the second aspect, in some implementations of the second aspect, the connector further includes a backplane connection part, including a first base. At least one through hole is disposed on a bottom surface of the first base. The backplane connection part includes at least one signal terminal pair. A first contact end of the first signal terminal pair is inserted into the through hole and fixed, and a second contact end is configured to combine with the first contact end of the second signal terminal pair. The backplane connection part includes at least one first shielding piece. The first shielding piece is disposed in parallel with the first signal terminal pair, and is wrapped around a periphery of the first signal terminal pair. When the subcard connection unit cooperates with the backplane connection part, the second contact end of the first signal terminal pair is combined with the first contact end of the second signal terminal pair in a one-to-one manner, and the first shielding piece cooperates with the second shielding piece in the one-to-one manner, to form a shielding cavity in which the first signal terminal pair and the second signal terminal pair are wrapped.

According to the backplane connection part and the subcard connection unit provided in embodiments of this disclosure, the first shielding piece and the second shielding piece that cooperate with each other to form the shielding cavity when the backplane connection part cooperates with the subcard connection part are respectively disposed on the backplane connection part and the subcard connection unit, to form the shielding cavity at each signal terminal or a periphery of a signal terminal pair. This avoids crosstalk of signals transmitted on different signal terminals or signal terminal pairs, and improves transmitted signal integrity. In addition, a shielding piece is separately disposed on the backplane connection part and the subcard connection unit. This can reduce processing complexity and facilitate processing.

With reference to the second aspect, in some implementations of the second aspect, the first shielding piece and the second shielding piece are of a C-shaped, U-shaped, or L-shaped piece structure. The first shielding piece cooperates with the second shielding piece in the one-to-one manner, to form a shielding cavity in which the first signal terminal pair and the second signal terminal pair are wrapped. In an embodiment, the first shielding piece cooperates with the second shielding piece, to form an annular shielding cavity that is wrapped around peripheries of the first signal terminal pair and the second signal terminal pair, or the first shielding piece cooperates with the second shielding piece, to form a rectangular shielding cavity that is wrapped around the peripheries of the first signal terminal pair and the second signal terminal pair.

With reference to the second aspect, in some implementations of the second aspect, at least one second protrusion is disposed on the third shielding piece and/or the fourth shielding piece in a direction opposite to the first cavity, such that when disposed in parallel, a plurality of subcard connection units can be connected to each other through the at least one second protrusion.

According to the signal connector provided in the embodiments of this application, a protrusion structure in the direction opposite to the first cavity is disposed on at least one side surface of the subcard connection unit, such that when the plurality of subcard connection units is arranged in parallel, adjacent subcard connection units can be in contact with other through the second protrusion. In this way, the signal return path is increased, the crosstalk between the signals is reduced, and the signal integrity is improved.

With reference to the second aspect, in some implementations of the second aspect, at least one spring is disposed on the second shielding piece, and when the first shielding piece cooperates with the second shielding piece, the spring is in contact with a side surface of the second shielding piece.

According to a third aspect, a signal connector is provided, including a plurality of subcard connection units. The plurality of subcard connection units include a first cavity. Two opposite side surfaces of the first cavity are respectively a third shielding piece and a fourth shielding piece, and at least one second protrusion is disposed on the third shielding piece and/or the fourth shielding piece in a direction opposite to the first cavity, such that when disposed in parallel on the backplane connection part, the plurality of subcard connection units can be connected to adjacent subcard connection units through the at least one second protrusion. The plurality of subcard connection units include at least one second signal terminal pair. The second signal terminal pair is disposed in the first cavity and is parallel to the third shielding piece and/or the fourth shielding piece. A first contact end of the second signal terminal pair extends outwards from a side surface of the first cavity. The plurality of subcard connection units include at least one second shielding piece. The second shielding piece is disposed in parallel with the second signal terminal pair, and the second shielding piece and a first shielding piece are in a one-to-one correspondence.

According to the signal connector provided in embodiments of this disclosure, a protrusion structure in the direction opposite to the first cavity is disposed on at least one side surface of the subcard connection unit, such that when the plurality of subcard connection units is arranged in parallel, adjacent subcard connection units can be in contact with each other through the second protrusion. In this way, a signal return path is increased, crosstalk between signals is reduced, and signal integrity is improved.

With reference to the third aspect, in some implementations of the third aspect, the connector further includes a backplane connection part, including a first base. At least one through hole is disposed on a bottom surface of the first base. The backplane connection part includes at least one first signal terminal pair. A first contact end of the first signal terminal pair is inserted into the through hole and fixed, and a second contact end is configured to combine with the first contact end of the second signal terminal pair. The backplane connection part includes at least one first shielding piece. The first shielding piece is disposed in parallel with the first signal terminal pair. When the subcard connection unit cooperates with the backplane connection part, the second contact end of the first signal terminal pair is combined with the first contact end of the second signal terminal pair in a one-to-one manner, and the first shielding piece cooperates with the second shielding piece in the one-to-one manner, to form a shielding cavity in which the first signal terminal pair and the second signal terminal pair are wrapped.

According to the backplane connection part and the subcard connection unit provided in embodiments of this disclosure, the first shielding piece and the second shielding piece that cooperate with each other to form the shielding cavity when the backplane connection part cooperates with the subcard connection part are respectively disposed on the backplane connection part and the subcard connection unit, to form the shielding cavity at each signal terminal or a periphery of a signal terminal pair. This avoids crosstalk of signals transmitted on different signal terminals or signal terminal pairs, and improves transmitted signal integrity. In addition, a shielding piece is separately disposed on the backplane connection part and the subcard connection unit. This can reduce processing complexity and facilitate processing.

With reference to the third aspect, in some implementations of the third aspect, the first shielding piece and/or the second shielding piece is of a C-shaped, U-shaped, or L-shaped piece structure. The first shielding piece cooperates with the second shielding piece in a one-to-one manner, to form a shielding cavity in which the first signal terminal pair and the second signal terminal pair are wrapped. In an embodiment, the first shielding piece cooperates with the second shielding piece, to form an annular shielding cavity that is wrapped around peripheries of the first signal terminal pair and the second signal terminal pair, or the first shielding piece cooperates with the second shielding piece, to form a rectangular shielding cavity that is wrapped around the peripheries of the first signal terminal pair and the second signal terminal pair.

With reference to the third aspect, in some implementations of the third aspect, at least one first protrusion is disposed on the third shielding piece and/or the fourth shielding piece in a direction facing the first cavity, to enable the third shielding piece and the fourth shielding piece to form at least one contact position.

According to the signal connector provided in the embodiments of this disclosure, protrusion structures facing each other are disposed on two side surfaces of the subcard connection unit, to enable the two side-surface shielding pieces to be connected through the protrusion structures. In this way, the signal return path can be increased, the crosstalk between signals can be reduced, and the signal integrity can be improved.

With reference to the third aspect, in some implementations of the third aspect, at least one spring is disposed on the second shielding piece, and when the first shielding piece cooperates with the second shielding piece, the spring is in contact with a side surface of the second shielding piece.

According to a fourth aspect, a terminal device is provided. The terminal device includes the signal connector according to any one of the first aspect to the third aspect.

DESCRIPTION OF EMBODIMENTS

The following describes technical solutions of the present disclosure with reference to accompanying drawings.

A signal connector provided in this application may be used in a PCB-based interconnection system combining a backplane and a subcard.

Figure 1:
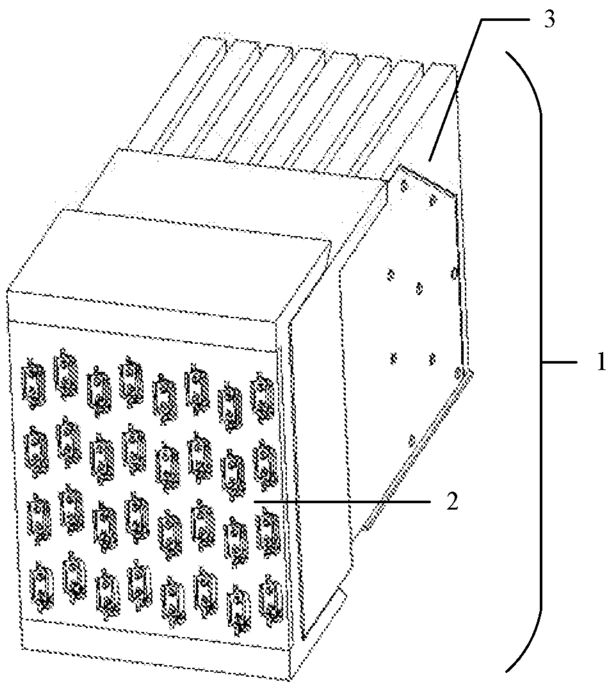
FIG. 1 is a schematic structural diagram of a signal connector according to an embodiment of the present disclosure.

FIG. 1 is a schematic structural diagram of a signal connector according to an embodiment of the present disclosure. As shown in FIG. 1, the signal connector 1 includes a backplane connection part 2 and a subcard connection unit 3. There may be a plurality of subcard connection units 3, and the backplane connection part 2 and the subcard connection unit 3 may cooperate with each other as shown in FIG. 1, to form the signal connector 1.

Figure 2:
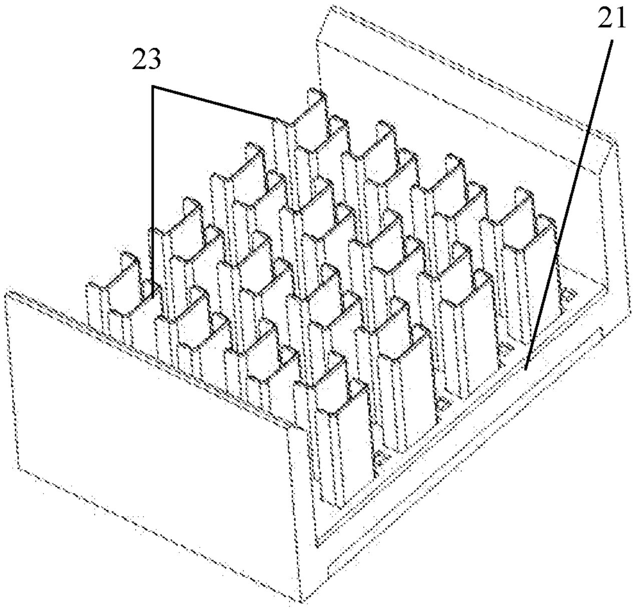
FIG. 2 is a schematic structural diagram of a backplane connection part according to an embodiment of the present disclosure.

FIG. 2 is a schematic structural diagram of a backplane connection part according to an embodiment of the present disclosure. The backplane connection part 2 may be formed by assembling a first base 21, at least one first signal terminal pair 22 (not shown in FIG. 2) disposed on the first base 21, and at least one first shielding piece 23. The following describes a specific structure of the backplane connection part 2 with reference to the accompanying drawing.

Figure 3:
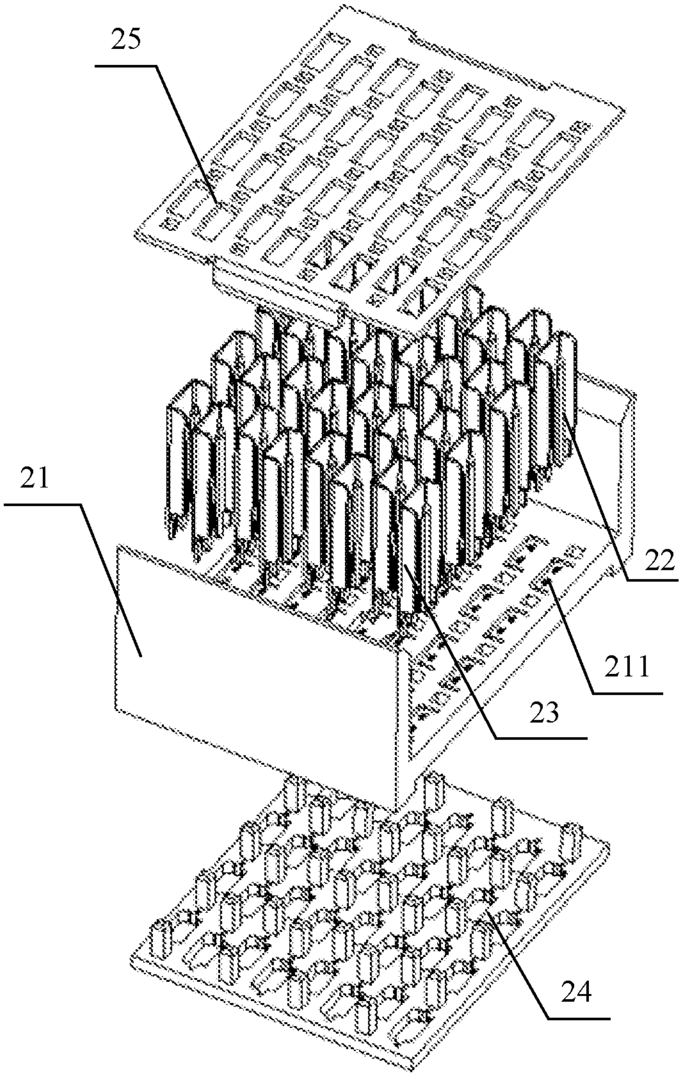
FIG. 3 is a schematic structural diagram of another backplane connection part according to an embodiment of the present disclosure.

FIG. 3 is a schematic structural diagram of a backplane connection part according to an embodiment of the present disclosure. Components of the backplane connection part 2 are: a first base 21, at least one first signal terminal 22, at least one first shielding piece 23, an electroplated plastic plate 24, and a metal piece 25.

The first base 21 is an insulated housing of a main accommodation cavity structure. The first base 21 is configured to provide strength support for a connector, and provide guidance for cooperation between the first base 21 and a subcard connection unit 3 of the connector. A plurality of through holes 211 are disposed on a bottom surface of the first base 21. The through hole 211 is configured to fasten the first signal terminal 23.

Optionally, a quantity of through holes 211 corresponding to a quantity of first signal terminal pairs 22, and a shape and a size of the through hole 211 are in a one-to-one correspondence with a shape and a size of a first contact end of the first signal terminal pair 22, so that the first signal terminal pair 22 can be inserted into and fastened to the through hole 211.

The first signal terminal pair 22 may be a differential signal terminal pair. The first signal terminal pair 22 is configured to transmit a signal, and the first signal terminal pair 22 includes the first contact end and a second contact end. The first contact end is inserted into the through hole 211, so that the first signal terminal pair 22 is fastened on the bottom surface of the first base 21. The second contact end is configured to, when the backplane connection part 2 cooperates with the subcard connection unit 3, combine with a first contact end of a second signal terminal pair 31. A specific combining manner is described in the following. In addition, it should be understood that if a single signal terminal or a plurality of signal terminals are used in application, a signal connector structure provided in this embodiment of the present disclosure may also be applied.

The first shielding piece 23 is in a one-to-one correspondence with the first signal terminal pair 22. To be specific, one first shielding piece 23 is disposed at a periphery of one first signal terminal pair 22. In addition, the first shielding piece 23 is wrapped around the periphery of the first signal terminal pair 22, and is distributed in a cross manner with the first signal terminal 22. The first shielding piece 23 is configured to form an isolation barrier between the first signal terminal pairs 22 to avoid interference between signals.

For example, as shown in FIG. 3, the first shielding piece 23 may be disposed, in parallel with the first signal terminal pair 22, on the bottom surface of the first base 21. In an embodiment, both the first signal terminal pair 22 and the first shielding piece 23 may be perpendicular to the bottom surface of the first base 21. The first shielding piece 23 is disposed at the periphery of the first signal terminal pair 22, and the first signal terminal pair 22 corresponding to the first shielding piece 23 is wrapped inside the first shielding piece 23.

Optionally, the first shielding piece 23 may have a plurality of structures. For example, the first shielding piece 23 may be of a C-shaped piece-like structure shown in FIG. 3, or may be of a U-shaped piece-like structure, an L-shaped piece-like structure, or the like. The structure of the first shielding piece 23 is not limited in the present disclosure.

It should be understood that the backplane connection part 2 includes the foregoing parts. In an embodiment, the first contact end of the first signal terminal pair 22 is inserted into a corresponding through hole on the bottom surface of the first base 21, so that the first signal terminal pair 22 is perpendicularly fastened on the bottom surface of the first base 21. The first shielding piece 23 is parallel to the first signal terminal pair 22 and fastened on the bottom surface of the first base 21, and is configured to isolate the first signal terminal pairs 22. The first shielding piece 23 is in the one-to-one correspondence with the first signal terminal pair 22 and is not in contact with the first signal terminal pair 22. The electroplated plastic plate 24 and the metal piece 25 are respectively disposed on two sides of the bottom surface of the first base 21. A through hole that enables the first signal terminal pair 22 and the first shielding piece 23 to pass through is disposed on the metal piece. In this way, the metal piece 25 can pass through the first signal terminal pairs 22 and the first shielding pieces 23 and be fastened above the base. Similarly, a through hole corresponding to the through hole 211 of the base may be disposed on the electroplated plastic plate, and the electroplated plastic plate is fastened under the base.

Figure 4:
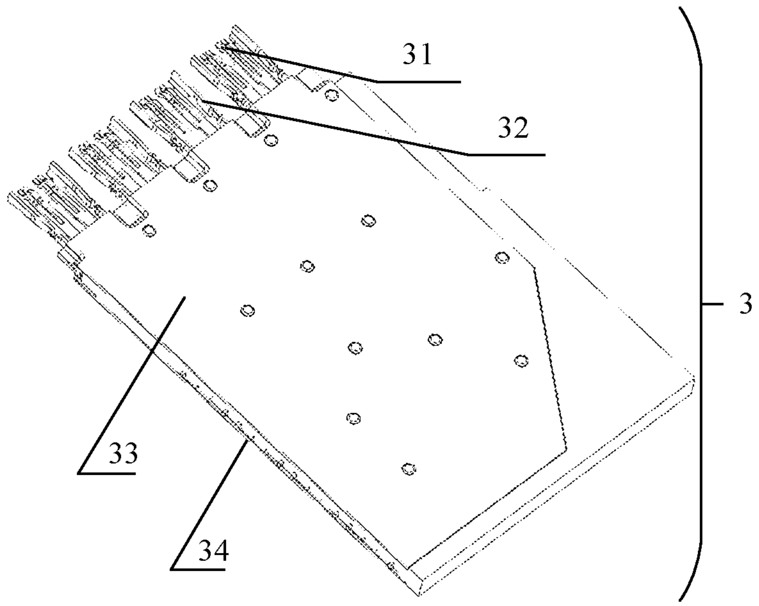
FIG. 4 is a schematic structural diagram of a subcard connection unit according to an embodiment of the present disclosure.

FIG. 4 is a schematic structural diagram of a subcard connection unit according to an embodiment of the present disclosure. As shown in FIG. 4, the subcard connection unit 3 includes at least one second signal terminal pair 31, at least one second shielding piece 32, a third shielding piece 33 and a fourth shielding piece 34 that cover the second signal terminal pair 31 and the second shielding piece 32, and a fastening module 35.

The second signal terminal pair 31 may be a differential signal terminal pair. The second signal terminal pair 31 is configured to transmit a signal, and includes a first contact end and a second contact end. The first contact end is configured to combine with a second contact end of a first signal terminal 22 when a backplane connection part 2 cooperates with the subcard connection unit 3. In addition, it should be understood that, if a single signal terminal or a plurality of signal terminals are used in an actual implementation, a signal connector structure provided in this embodiment of the present disclosure may also be applied.

The second shielding piece 32 may be disposed in parallel with the second signal terminal pair 31, and disposed between the third shielding piece 33 and the fourth shielding piece 34. That is, the third shielding piece 33, the second shielding piece 32, and the fourth shielding piece 34 are arranged from top to bottom, and are fastened together by riveting or in another manner. The third shielding piece 33 may be used as a first plane for signal backflow, the second shielding piece 32 may be used as a second plane for the signal backflow, and the fourth shielding piece 34 may be used as a third plane for the signal backflow. In this way, a signal can be flowed back through a closest ground shielding piece, and this improves a crosstalk resonance point of a signal connector.

Optionally, the second shielding piece 32 has a structure corresponding to the first shielding piece 23. Therefore, when the backplane connector 2 and the subcard connector 3 cooperate with each other, the first shielding piece 23 and the second shielding piece 32 can form, by sleeving, plugging, buckling, or the like, a shielding cavity in which a first signal terminal pair 22 and a second signal terminal pair 31 are wrapped. Because the second shielding piece 32 and the first shielding piece 23 have different structures, correspondingly, the shielding cavity has different shapes in appearance. For example, the shielding cavity may be an annular shielding cavity. In this case, the first signal terminal pair 22 and the second signal terminal pair 31 are located inside the annular shielding cavity. Alternatively, the shielding cavity may be a rectangular shielding cavity, that is, a cross section of the shielding cavity is in a rectangular shape, and the like. The shape of the shielding cavity is not limited in the present disclosure.

Optionally, the second shielding piece 32 is a C-shaped, U-shaped, or L-shaped piece structure.

Optionally, a half-wrapped shielding structure 321 corresponding to a shape and a position of the second signal terminal pair 31 may be disposed on the second shielding piece 32. In an embodiment, the shielding structure 321 may be a plurality of C-shaped, U-shaped, or L-shaped shielding piece structures arranged in parallel. A connection position 322 may be disposed on each shielding piece structure at intervals.

The third shielding piece 33 and the fourth shielding piece 34 may form, in a mating surface near the backplane connector 2 and the subcard connection unit 3, a first cavity together with a local structure of the fastening module 35. In an embodiment, the first cavity is a cubic cavity, the third shielding piece 33 and the fourth shielding piece 34 are two opposite side surfaces of the first cavity, and the second signal terminal pair 31 and the second shielding piece 32 are both disposed inside the first cavity.

The fastening module 35 may be a terminal plastic injection module, and is configured to fasten the second signal terminal pair 31. For ease of description, a part formed by the fastening module 35 and the second signal terminal is referred to as a signal transmission part.

The following describes a structure of the subcard connection unit 3 in detail with reference to the accompanying drawings.

FIG. 5A to FIG. 5D are schematic structural diagrams of different components of a subcard connection unit according to an embodiment of the present disclosure.

Figure 5A:
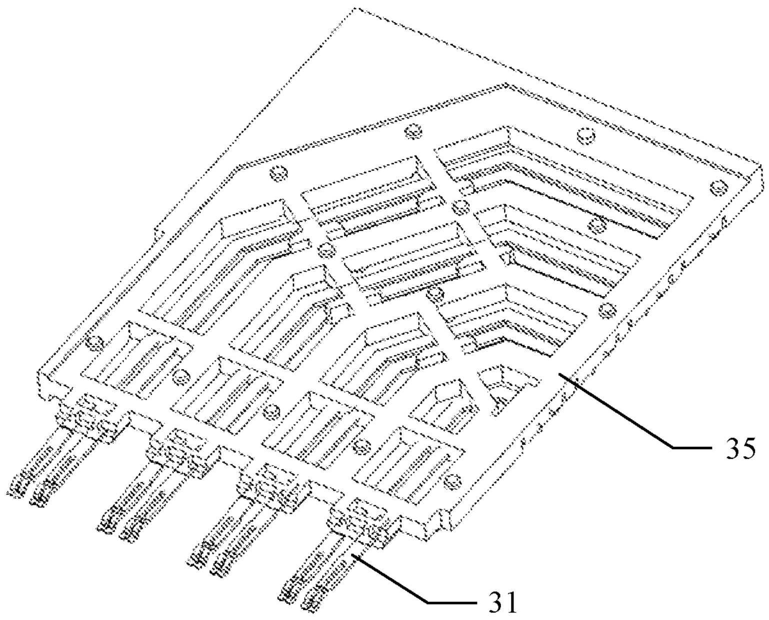
FIG. 5A is a schematic structural diagram of a signal transmission part of a subcard connection unit according to the present disclosure.

FIG. 5A is a schematic structural diagram of a signal transmission part of a subcard connection unit according to the present disclosure.

The signal transmission part includes at least one second signal terminal pair 31 and a fastening module 35. As shown in FIG. 5A, a plurality of second signal terminal pairs 31 may be arranged on the fastening module 35 in parallel, and the second signal terminal pairs 31 are connected and fastened through the fixing module 35. In addition, a first contact end of the second signal terminal pair 31 extends outwards from one side surface of the fastening module 35.

Optionally, the first contact end of the second signal terminal pair 31 is corresponding to a second contact end of a first signal terminal pair 22. For example, a spacing, a structure, and the like of the first contact end of the second signal terminal pair 31 are separately corresponding to that of the second contact end of the first signal terminal pair 22. That is, when a backplane connection part 2 cooperates with a subcard connection unit 3, the first contact end of the second signal terminal pair 31 can be correspondingly combined with the second contact end of the first signal terminal pair 22, to form a signal transmission path. This ensures normal signal transmission.

Figure 5B:
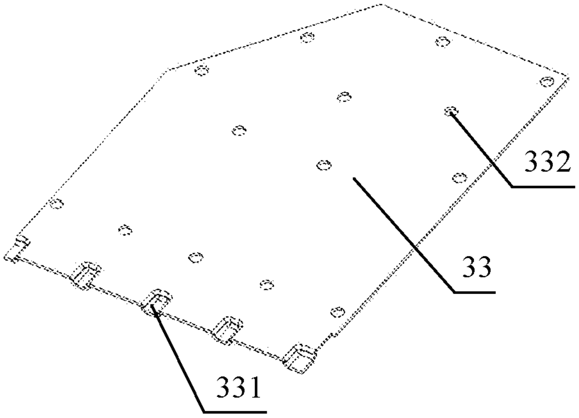
FIG. 5B is a schematic structural diagram of a shielding piece in a subcard connection unit according to the present disclosure.
Figure 5C:
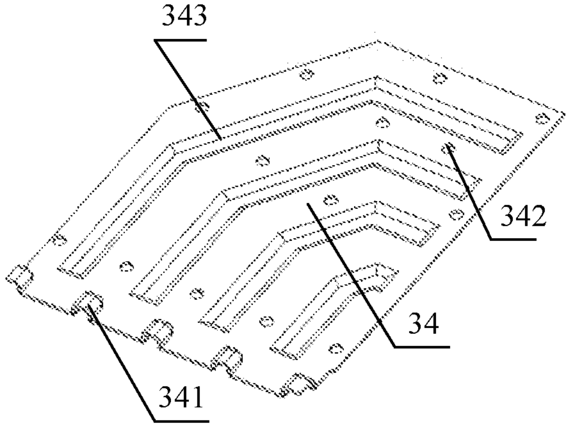
FIG. 5C is a schematic structural diagram of another shielding piece in a subcard connection unit according to the present disclosure.

FIG. 5B is a schematic structural diagram of a third shielding piece in the subcard connection unit according to the present disclosure. FIG. 5C is a schematic structural diagram of a fourth shielding piece in the subcard connection unit according to the present disclosure.

The third shielding piece 33 and the fourth shielding piece 34 separately cover the signal transmission part formed by the second signal terminal pair 31 and the fastening module 35. The third shielding piece 33, the fourth shielding piece 34, and the side surface of the fastening module 35 jointly form a first cavity. The third shielding piece 33 may be used as a lower bottom surface of the first cavity, and the fourth shielding piece 34 may be used as an upper bottom surface of the first cavity, to wrap the second signal terminal pair 31 in the first cavity.

Optionally, a plurality of first protrusion structures 331 in a direction facing inside the first cavity are further disposed on the third shielding piece 33, and/or a plurality of first protrusion structures 341 in the direction facing inside the first cavity are further disposed on the fourth shielding piece 34.

Optionally, a plurality of through holes 332 are further disposed on the third shielding piece 33 and/or the fourth shielding piece 34. Therefore, when the third shielding piece 33 and the fourth shielding piece 34 are assembled into the first cavity, the third shielding piece 33 and the fourth shielding piece 34 may be fastened through the through hole by a component such as a rivet.

Optionally, a plurality of second protrusions 332 in a direction opposite to the first cavity may be disposed on the third shielding piece 33, and/or a plurality of second protrusions 342 in the direction opposite to the first cavity may be disposed on the fourth shielding piece 34. When the plurality of subcard connection units 3 is arranged in parallel, adjacent subcard connection units 3 are connected to each other through the second protrusion.

Figure 5D:
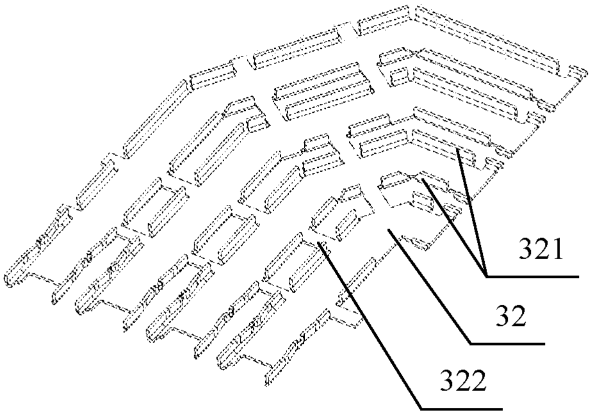
FIG. 5D is a schematic structural diagram of still another shielding piece in a subcard connection unit according to the present disclosure.

FIG. 5D is a schematic structural diagram of a second shielding piece in the subcard connection unit according to the present disclosure.

A structure of the second shielding piece 32 is corresponding to a structure of a first shielding piece 23. When the backplane connection part 2 cooperates with the subcard connection unit 3, the first shielding piece 23 and the corresponding second shielding piece 32 may form, by plugging, sleeving, buckling, or the like, a shielding cavity in which the first signal terminal pair 22 and the second signal terminal pair 31 are wrapped.

It should be understood that the second shielding piece 32 may have a plurality of structures. The structure of the second shielding piece 32 may be corresponding to that of the second signal terminal pair 31 and that of the fastening module 35. In other words, when the second shielding piece 32 is combined with the second signal terminal pair 31 and the terminal plastic injection module 35, the second shielding piece 32 may be parallel to the second signal terminal pair 31 and fastened on the fastening module 35, and the second shielding piece 32 is disposed at a periphery of the second signal terminal pair 31. The second shielding piece 32 partially wraps the second signal terminal pair 31.

According to the backplane connection part 2 and the subcard connection unit 3 provided in this embodiment of the present disclosure, the first shielding piece 23 and the second shielding piece 32 that cooperate with each other to form the shielding cavity when the backplane connection part 2 cooperates with the subcard connection part 3 are respectively disposed on the backplane connection part 2 and the subcard connection unit 3, to form the shielding cavity at each signal terminal or a periphery of a signal terminal pair. This avoids crosstalk of signals transmitted on different signal terminals or signal terminal pairs, and improves transmitted signal integrity. In addition, a shielding piece is separately disposed on the backplane connection part 2 and the subcard connection unit 3. This can reduce processing complexity and facilitate processing.

Figure 6A:
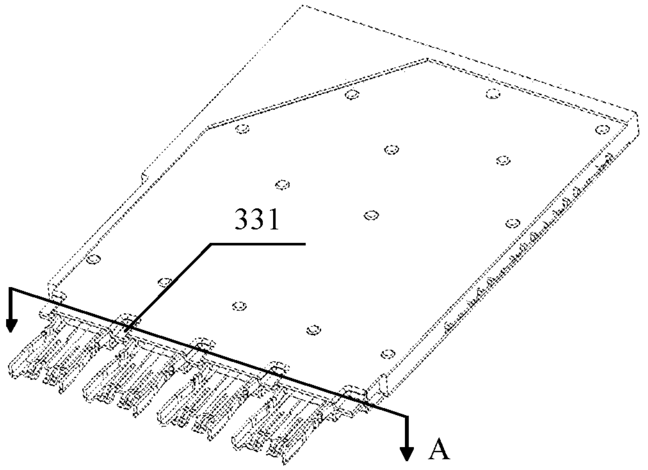
FIG. 6A is a schematic structural diagram of a subcard connection unit according to an embodiment of the present disclosure.

FIG. 6A is a schematic structural diagram of a subcard connection unit according to an embodiment of the present disclosure.

Figure 6B:
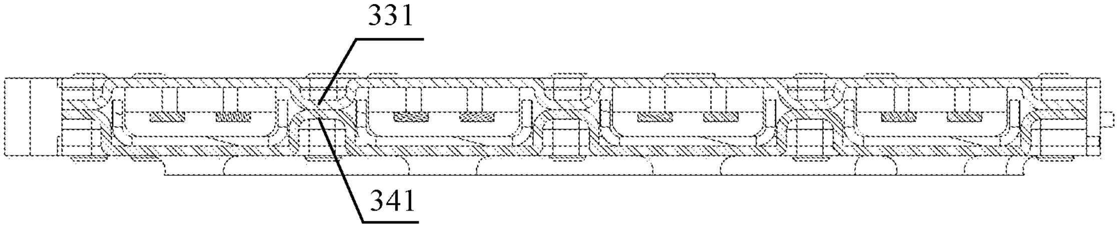
FIG. 6B is a side view of the subcard connection unit in an A-A direction in FIG. 6A.

FIG. 6B is a side view of the subcard connection unit in an A-A direction in FIG. 6A.

It should be understood that, as described above, the subcard connection unit 3 may be formed by assembling a second signal terminal pair 31, a second shielding piece 32, a third shielding piece 33, a fourth shielding piece 34, and a fastening module 35. The third shielding piece 33, the fourth shielding piece 34, and the terminal plastic injection module 35 form a first cavity. The third shielding piece 33 and the fourth shielding piece 34 are two opposite side surfaces of the first cavity.

Optionally, at least one protrusion structure in a direction facing inside the first cavity is disposed on the third shielding piece 33 and/or the fourth shielding piece 34, such that when being used as the two opposite side surfaces of the first cavity, the third shielding piece 33 and the fourth shielding piece 34 may be in contact through the at least one first protrusion. In an embodiment, at least one first protrusion structure 331 in the direction facing inside the first cavity is disposed on the third shielding piece 33, and the fourth shielding piece 34 is a planar structure. In addition, a height of the first protrusion structure 331 enables the first protrusion structure 331 to be connected to the fourth shielding piece 34. In an embodiment, the height of the first protrusion structure 331 is equivalent to a thickness of the first cavity. Alternatively, at least one first protrusion structure 341 in the direction facing inside the first cavity is disposed on the fourth shielding piece 34, and the third shielding piece 33 is the planar structure. A height of the first protrusion structure 341 enables the first protrusion structure 341 to be connected to the third shielding piece 33. In an embodiment, the height of the first protrusion structure 341 is equivalent to the thickness of the first cavity. Alternatively, at least one protrusion structure (the first protrusion structures 331 and 341) is disposed on both the third shielding piece 33 and the fourth shielding piece 34. In addition, a position of the protrusion structure on the third shielding piece 33 is corresponding to a position of the protrusion structure on the fourth shielding piece 34. Therefore, when the third shielding piece 33 and the fourth shielding piece 34 is assembled into the two opposite side surfaces of the first cavity, the protrusion structure on the third shielding piece 33 is connected to the protrusion structure in a corresponding position on the fourth shielding piece 34. In addition, a sum of the height of the protrusion structure on the third shielding piece 33 and the height of the protrusion structure in the corresponding position on the fourth shielding piece 34 is exactly the thickness of the first cavity.

According to the subcard connection unit provided in this embodiment, there is at least one connection part on a relative side surface of the subcard connection unit. This can increase a signal backflow path and improves integrity in a signal transmission process.

Figure 7:
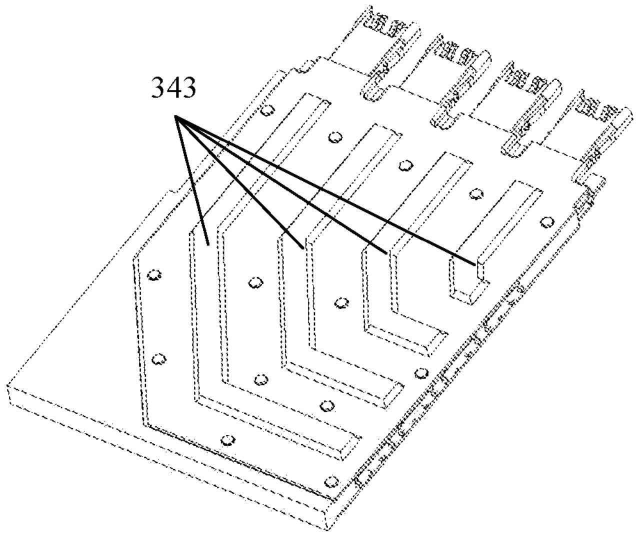
FIG. 7 is a schematic structural diagram of another subcard connection unit according to an embodiment of the present disclosure.

FIG. 7 is a schematic structural diagram of another subcard connection unit according to an embodiment of the present disclosure.

Figure 8:
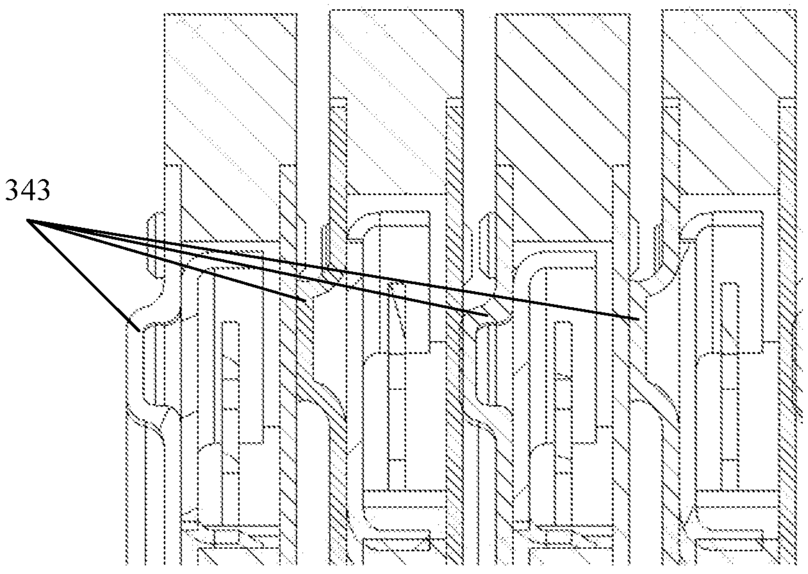
FIG. 8 is a schematic structural diagram of a plurality of subcard connection units arranged in parallel according to an embodiment of the present disclosure.

It can be seen that a second protrusion structure is disposed on a surface of a shielding piece of the subcard connection unit provided in this embodiment. Therefore, when a plurality of subcard connection units cooperate with a backplane connection part, adjacent subcard connection units 3 arranged in parallel may be connected to each other through the second protrusion structure, to implement electrical conduction. In an embodiment, third shielding pieces 33 and fourth shielding pieces 34 of all subcard connection units in a connector may be connected through the second protrusion structure, to improve a crosstalk resonance point of the connector 1. A schematic structure in which the adjacent subcard connection units 3 are connected to each other through the second protrusion structure is shown in FIG. 8.

Optionally, the second protrusion structure may be a protrusion structure disposed on a surface of the third shielding piece 33, and protrudes in a direction opposite to a first cavity; and/or the second protrusion structure may be a protrusion structure (for example, a protrusion 343 shown in FIG. 7) disposed on a surface of the fourth shielding piece 34, and protrudes in the direction opposite to the first cavity.

Optionally, the second protrusion structure and a second signal terminal pair 31 may have a same or similar shape, a same or similar direction, and the like. For example, as shown in FIG. 7, the second protrusion structure may be parallel to the second signal terminal pair 31 and disposed at a projection position of the second signal terminal pair 31 on the surface of the third shielding piece 33 and/or the surface of the fourth shielding piece 34. In this way, a second protrusion at a closest position may be selected as a signal return path for a transmitted signal.

It should be understood that the second protrusion structure is disposed to implement electrical conduction between the third shielding piece 33 and the fourth shielding piece 34 of each subcard connection unit 3. A specific shape, location, size, and the like of the second protrusion structure are not limited to those shown in FIG. 7.

Figure 9:
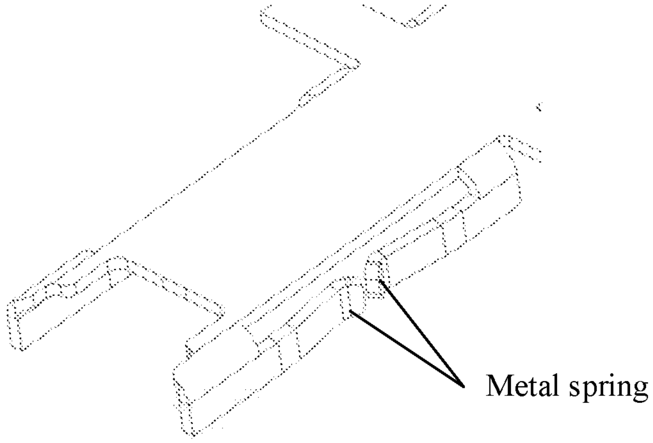
FIG. 9 is a schematic structural diagram of a shielding piece according to an embodiment of the present disclosure.

FIG. 9 is a schematic structural diagram of a shielding piece according to an embodiment of the present disclosure. The shielding piece shown in FIG. 9 may be the first shielding piece 23 or the second shielding piece 32 described above.

As described above, when a backplane connection part 2 and a subcard connection unit 3 are assembled, the first shielding piece 23 and the second shielding piece 32 are assembled as a shielding cavity wrapped around a periphery of a first signal terminal pair 22 and a second signal terminal pair 31. The first shielding piece 23 and the second shielding piece 32 may be assembled by sleeving, plugging, buckling, or the like. The first shielding piece 23 and the second shielding piece 32 may be in contact with each other by assembling the first shielding piece 23 and the second shielding piece 32.

Figure 10:
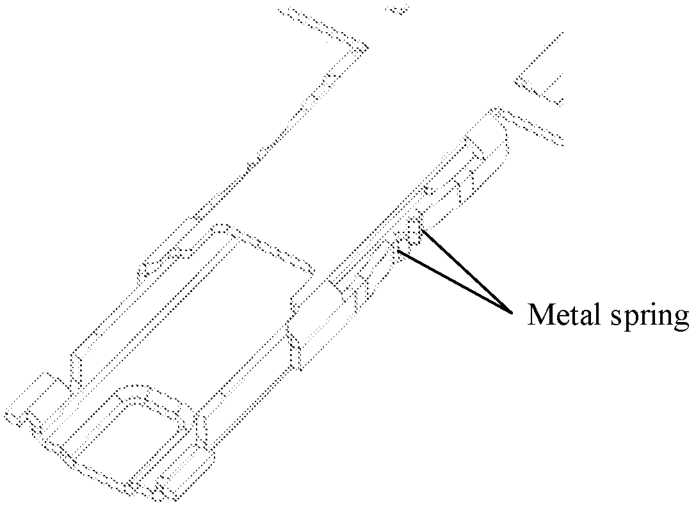
FIG. 10 is a schematic structural diagram of an assembly structure of a shielding piece according to an embodiment of the present disclosure.

For example, at least one metal spring is disposed on at least one side surface of the first shielding piece 23, and when the first shielding piece 23 is sleeved or plugged with the second shielding piece 32, a contact point can be formed between the first shielding piece 23 and the second shielding piece 32 through the metal spring, so that the first shielding piece 23 and the second shielding piece 32 form at least one contact position; and/or, at least one metal spring is disposed on at least one side surface of the second shielding piece 32, and when the second shielding piece 32 is sleeved or plugged with the first shielding piece 23, a contact point is formed between the second shielding piece 32 and the first shielding piece 23 through the metal spring plate, so that the first shielding piece 23 and the second shielding piece 32 form at least one contact position. FIG. 10 is a schematic diagram of the contact position formed between the first shielding piece 23 and the second shielding piece 32 through the metal spring.

It should be understood that, in the present disclosure, a size of the first shielding piece 23 and a size of the second shielding piece 32 may be further set to enable that when being sleeved or plugged, the first shielding piece 23 and the second shielding piece 32 may be just in contact through the side surface, to implement connection between the first shielding piece 23 and the second shielding piece 32. To enable the first shielding piece 23 and the second shielding piece 32 to be in contact with each other after being assembled, there may be a plurality of specific structures of the first shielding piece 23 and/or the second shielding piece 32. This is not limited in the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of this application. Therefore, the protection scope of this application shall be subject to the protection scope of the claims.

What is claimed is:

1. A signal connector comprising:

a backplane connection part and at least one subcard connection unit, wherein the backplane connection part comprises:

a first base, wherein at least one through hole is disposed on a bottom surface of the first base;

at least one first signal terminal pair, wherein a first contact end of the at least one first signal terminal pair is inserted into the through hole and fastened, and a second contact end of the at least one first signal terminal pair; and at least one first shielding piece, wherein the first shielding piece is disposed in parallel with the at least one first signal terminal pair;

wherein the subcard connection unit comprises:

at least one second signal terminal pair comprising a third contact end, corresponding to the at least one first signal terminal pair, configured to combine with the second contact end, and arranged in parallel;

a fastening module configured to fasten the at least one second signal terminal pair, wherein the third contact end extends outwards from a side surface of the fastening module; and a second shielding piece parallel to the second signal terminal pair and disposed at a periphery of the second signal terminal pair, wherein the second shielding piece corresponds to the first shielding piece, and wherein when the subcard connection unit cooperates with the backplane connection part, the second contact end of the at least one first signal terminal pair is configured to combine with the first contact end of the second signal terminal pair and the first shielding piece is configured to cooperate with the second shielding piece to form a shielding cavity in which the at least one first signal terminal pair and the second signal terminal pair are wrapped.

2. The signal connector according to claim 1, wherein the first shielding piece and the second shielding piece have a C-shaped, U-shaped, or L-shaped structure, and wherein the first shielding piece is configured to cooperate with the second shielding piece to form one of an annular shielding cavity that is wrapped around peripheries of the at least one first signal terminal pair and the second signal terminal pair; or a rectangular shielding cavity that is wrapped around the peripheries of the at least one first signal terminal pair and the second signal terminal pair.

3. The signal connector according to claim 1, wherein the subcard connection unit further comprises:

a third shielding piece and a fourth shielding piece, wherein the third shielding piece and the fourth shielding piece respectively cover two sides of the fastening module to form a first cavity that accommodates the second signal terminal pair.

4. The signal connector according to claim 3, wherein at least one first protrusion is disposed on at least one of the third shielding piece or the fourth shielding piece in a direction facing the first cavity to enable the third shielding piece and the fourth shielding piece to form at least one contact position.

5. The signal connector according to claim 3, wherein at least one second protrusion is disposed on at least one of the third shielding piece or the fourth shielding piece in a direction opposite from the first cavity to enable a plurality of subcard connection units, when disposed in parallel, to be connected to each other through the at least one second protrusion.

6. A signal connector, comprising:

a plurality of subcard connection units each subcard connection unit comprising:

a first cavity, wherein two opposite side surfaces of the first cavity are respectively a third shielding piece and a fourth shielding piece, and at least one first protrusion is disposed on at least one of the third shielding piece or the fourth shielding piece in a direction facing the first cavity to enable the third shielding piece and the fourth shielding piece to form at least one contact position;

at least one second signal terminal pair disposed in the first cavity, parallel to at least one of the third shielding piece or the fourth shielding piece, and comprising a first contact end extending outwards from a side surface of the first cavity;

a first shielding piece; and at least one second shielding piece disposed in parallel with the second signal terminal pair and corresponding to the first shielding piece.

7. The signal connector according to claim 6, further comprising a backplane connection part, wherein the backplane connection part comprises:

a first base, wherein at least one through hole is disposed on a bottom surface of the first base;

at least one at least one first signal terminal pair, wherein a first contact end of the at least one first signal terminal pair is inserted into the through hole and fastened, and a second contact end of the at least one first signal terminal pair is configured to combine with the first contact end of the second signal terminal pair; and at least one first shielding piece, wherein the first shielding piece is disposed in parallel with the at least one first signal terminal pair, and is wrapped around a periphery of the at least one first signal terminal pair;

wherein when a subcard connection unit cooperates with the backplane connection part, the second contact end of the at least one first signal terminal pair is combined with the first contact end of the second signal terminal pair, and the first shielding piece cooperates with the second shielding piece to form a shielding cavity in which the at least one first signal terminal pair and the second signal terminal pair are wrapped.

8. The signal connector according to claim 7, wherein the first shielding piece and the second shielding piece have a C-shaped, U-shaped, or L-shaped structure; and the first shielding piece is configured to cooperate with the second shielding piece to form one of an annular shielding cavity that is wrapped around peripheries of the at least one first signal terminal pair and the second signal terminal pair, or a rectangular shielding cavity that is wrapped around the peripheries of the at least one first signal terminal pair and the second signal terminal pair.

9. The signal connector according to claim 6, wherein at least one second protrusion is disposed on at least one of the third shielding piece or the fourth shielding piece in a direction opposite from the first cavity, to enable the plurality of subcard connection units, when disposed in parallel, to be connected to each other through the at least one second protrusion.

10. The signal connector according to claim 6, wherein a spring is disposed on the second shielding piece, and when the first shielding piece cooperates with the second shielding piece, the spring is in contact with a side surface of the second shielding piece.

11. The signal connector according to claim 6, further comprising:

a base; and a plastic plate fastened under the base.

12. The signal connector according to claim 7, further comprising a metal piece, wherein the metal piece passes through the at least one first signal terminal pair and the first shielding piece and is fastened above the first base.

13. The signal connector according to claim 12, wherein the metal piece comprises a through hole, and wherein the through hole is configured to enable the at least one first signal terminal pair and the first shielding piece to pass through.

14. The signal connector according to claim 7, wherein the at least one first signal terminal pair and the second signal terminal pair are differential signal terminal pairs.

15. The signal connector according to claim 6, wherein the third shielding piece, the second shielding piece, and the fourth shielding piece are sequentially arranged, riveted, and fastened.

16. The signal connector according to claim 15, wherein the third shielding piece is configured to be a first plane for signal backflow, wherein the second shielding piece is configured to be a second plane for the signal backflow, and wherein the fourth shielding piece is configured to be a third plane for the signal backflow.

17. The signal connector according to claim 7, wherein the first shielding piece and the second shielding piece form, by one of sleeving, plugging, or buckling, a shielding cavity in which the at least one first signal terminal pair and the second signal terminal pair are wrapped.

18. The signal connector according to claim 17, wherein the shielding cavity is annular or rectangular.

19. The signal connector according to claim 6, wherein the first shielding piece is in contact with the second shielding piece through a metal spring.

20. A terminal device comprising:

a signal connector comprising a plurality of subcard connection units each comprising:

a first cavity, wherein two opposite side surfaces of the first cavity are respectively a third shielding piece and a fourth shielding piece, and at least one first protrusion is disposed on at least one of the third shielding piece or the fourth shielding piece in a direction facing the first cavity, to enable the third shielding piece and the fourth shielding piece to form at least one contact position;

at least one second signal terminal pair, wherein the second signal terminal pair is disposed in the first cavity and is parallel to at least one of the third shielding piece or the fourth shielding piece, and a first contact end of the second signal terminal pair extends outwards from a side surface of the first cavity; and at least one second shielding piece, wherein the second shielding piece is disposed in parallel with the second signal terminal pair, and the second shielding piece is corresponding to a first shielding piece.

* * * * *